(12) United States Patent
Höfele et al.

(10) Patent No.: US 11,841,698 B2
(45) Date of Patent: Dec. 12, 2023

(54) ARRANGEMENT AND METHOD FOR SECURE EXECUTION OF AN AUTOMATION PROGRAM IN A CLOUD COMPUTING ENVIRONMENT

(71) Applicant: Siemens Aktiengesellschaft, Munich (DE)

(72) Inventors: Markus Höfele, Mannheim (DE); Peter Kob, Heroldsberg (DE); Rolf Schrey, Mönchengladbach (DE); Armin Zeltner, Weisendorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 305 days.

(21) Appl. No.: 17/029,172

(22) Filed: Sep. 23, 2020

(65) Prior Publication Data

US 2021/0089009 A1  Mar. 25, 2021

(30) Foreign Application Priority Data

Sep. 24, 2019 (EP) .................................. 19199211

(51) Int. Cl.
*G05B 19/418* (2006.01)
*G06F 9/50* (2006.01)

(52) U.S. Cl.
CPC ..... *G05B 19/4185* (2013.01); *G05B 19/4183* (2013.01); *G05B 19/41865* (2013.01);
(Continued)

(58) Field of Classification Search
None
See application file for complete search history.

(56) References Cited

U.S. PATENT DOCUMENTS 9,417,986 B1    8/2016  Bates et al.
2015/0381567 A1* 12/2015  Johnson .............. H04L 63/0227
                                                    726/12
(Continued)

OTHER PUBLICATIONS

Vater et al., "A reference architecture based on Edge and Cloud Computing for Smart Manufacturing", 2019 28th International Conference on Computer Communication and Networks (ICCCN), Jul. 29, 2019-Aug. 1, 2019, pp. 1-7 (Year: 2019).*

(Continued)

*Primary Examiner* — Eric C Wai
(74) *Attorney, Agent, or Firm* — Cozen O'Connor

(57) ABSTRACT

Arrangement and method for securely executing an automation program in a cloud computing environment, wherein the automation program is installed on computer hardware in a public IT infrastructure, and wherein the computer hardware is connected via a data connection to a cloud server, where the connection and a dedicated runtime environment of the computer hardware are configured such that the automation program is transferrable onto the computer hardware and its execution can be monitored via the server and data connection, such that the automation program and sensitive information, i.e., recipes, instructions and/or method steps, contained therein can be executed in a protected environment, effective protection against interception is achieved and such that the dedicated hardware can be matched to a possibly pre-existing automation program so that existing automation programs can execute in the cloud or be made available without modification and further system tests, certifications and other costly adaptation steps.

21 Claims, 2 Drawing Sheets

(52) U.S. Cl.
CPC ............ *G06F 9/505* (2013.01); *G06F 9/5044* (2013.01); *G06F 9/5072* (2013.01)

(56) References Cited

U.S. PATENT DOCUMENTS

| | | | |
|---|---|---|---|
| 2016/0248642 A1 | 8/2016 | Rajasekar | |
| 2017/0351856 A1* | 12/2017 | McGeorge | ............. H04L 67/34 |
| 2019/0163173 A1 | 5/2019 | Goldschmidt et al. | |
| 2019/0379706 A1* | 12/2019 | Verma | ................... H04L 63/205 |

OTHER PUBLICATIONS

EP Search report dated Dec. 3, 2020 based on EP19199211 filed Sep. 24, 2019.

* cited by examiner

ARRANGEMENT AND METHOD FOR SECURE EXECUTION OF AN AUTOMATION PROGRAM IN A CLOUD COMPUTING ENVIRONMENT

BACKGROUND OF THE INVENTION

1. Field of the Invention

The invention relates to industrial automation systems and, more particularly, to an arrangement and method for secure execution of an automation program in a cloud computing environment.

2. Description of the Related Art

Cloud computing is increasingly used in many technical fields. In principle, this involves a computer infrastructure that is available in a higher-level or public data network, in particular the Internet. The core of such solutions comprises cloud servers, normally powerful computing capacities usable independently by a plurality of users, the use of said capacities being subject to a payment. Private cloud computing solutions also exist which, although they are not public, similarly have a central server infrastructure with which, in particular, companies with a plurality of sites or multinational companies at least partially centralize their data processing and data storage. The cloud servers frequently operate with virtualization technologies, so that a user can trigger the instantiation of a virtual machine for his purposes, where his application or the like then runs in this virtual machine. Similarly, cloud-based storage devices can also be provided and other resources can also be used.

Cloud computing solutions of this type are also increasingly used in industrial automation technology. One application is, for example, the "virtualization" of an industrial controller (Programmable Logic Controller (PLC)), where the industrial control program that controls an automation solution, a process plant or the like, runs "in the cloud", i.e., on a cloud server, and receives sensor values and other input parameters via a data connection from the plant that is to be controlled and feeds back commands for actuators and other output values.

In the case of configurations of this type, in which a (possibly virtual) machine is installed on a cloud-based computer (cloud server) and therefore sensitive applications or functions, in particular an industrial control task, run at a "semi-local" level, there is a disadvantage because the security level in relation to data security depends on the respective "substructure" of the virtualization solution and cannot be reliably assessed by a user/customer. This means that the cloud computing technologies are often not used for applications that are sensitive in terms of data technology or safety technology because of the existing fear that the programs, data and algorithms used in the cloud solution can be intercepted. A further disadvantage is that, for the control of industrial automation arrangements, such as in the production of chemical or pharmaceutical products, vendor-specific (dedicated) programs and recipes are used for programmable logic controllers that are difficult to port onto standard hardware because they are emulated in the virtual machines of the cloud servers. An emulation of a dedicated programmable logic controller that is often required for this reason normally also comprises the execution of firmware and operating systems that are actually intended for a private environment (local automation level), and which are correspondingly poorly protected against interception if they are operated in a public environment.

SUMMARY OF THE INVENTION

In view of the foregoing, it is therefore an object of the present invention to provide a method and arrangement for secure execution of an automation program in a cloud computing environment.

This and other objects and advantages are achieved in accordance with the invention by an arrangement for secure execution of an automation program in a cloud computing environment is provided, where the automation program is installed on computer hardware in a publicly accessible IT infrastructure, and where the computer hardware is connected via at least one data connection to a cloud server, in particular a server of a cloud computing provider. The computer hardware is dedicated hardware for execution of the automation program, where the computer hardware is equipped with a dedicated runtime environment for the automation program, and where the data connection and the runtime environment are configured such that the execution of the automation program can be monitored via the cloud server and the data connection. In accordance with the invention, the cloud server is therefore configured for data exchange with an industrial automation arrangement, and the automation program is therefore advantageously configured to control, influence or monitor the industrial automation arrangement. Through this data exchange, it is therefore possible to control and monitor corresponding local units from a cloud environment without exposing the dedicated computer hardware to local access. It is furthermore thus possible to control a plurality of local units that can be located at different sites via the same computer hardware. Through this arrangement, it is possible to execute the automation program and the sensitive information, in particular recipes, instructions, or method steps, contained within the automation program in a protected environment, as a result of which substantially more effective protection against interception is achieved compared with executing on standard hardware. An additional advantage is that the dedicated hardware can be matched to a possibly pre-existing automation program so that existing automation programs provided to execute on dedicated hardware can execute in the cloud or can be made available via the cloud without modification and without a further system test, certification and other costly adaptation steps.

A core idea of the solution in accordance with the invention is that dedicated computer hardware is provided, which offers a secure runtime environment for critical functions, sensitive programs, or recipes, where it is intended to involve specifically configured hardware that is correspondingly protected against attacks and is therefore neither conventional PC hardware nor a standardized virtual machine on a publicly accessible server. This dedicated computer hardware is intended to perform the data exchange with the automation solution via the cloud server in encrypted form. The dedicated computer hardware can either be a direct component of the cloud computing environment or can be linked thereto via a data connection.

The object is further achieved by a method for secure execution of an automation program in a cloud computing environment, where the automation program is installed on computer hardware in a publicly accessible IT infrastructure. Dedicated hardware is used as the computer hardware for execution of the automation program, where the automation program is executed on the computer hardware via a dedicated runtime environment, and where the execution of the automation program is monitored via a data connection. In accordance with the invention, the server is therefore configured for data exchange with an industrial automation arrangement, and the automation program is therefore advantageously configured to control or influence or monitor the industrial automation arrangement. The previously discussed advantages with reference to the arrangement can be achieved by this method.

In one advantageous embodiment, the computer hardware loads the automation program from a cloud server, in particular a server of a cloud computing provider, via the at least one data connection or via a separate data connection. The system can thus be administered entirely without local access to the dedicated hardware and, in particular, the automation program can easily be modified. This access can advantageously be secured in a particular manner in order to avoid unauthorized (read or write) access to the automation program and its program parameters (or "recipes").

Advantageously, the runtime environment is firmware and/or an operating system for an industrial automation program or comprises these software units. As a result, it is possible to use an already existing industrial automation program without substantial modifications. The firmware and/or the operating system and the automation program operated therewith are secured against readout via the data connection. Due to technical facilities of this type, in particular security routines in a communication stack of the computer hardware, it can be provided, in particular, that an automation program, and possibly parts of the execution environment, are loaded onto the dedicated computer hardware but can no longer be read out. This is particularly advantageous if the runtime environment, i.e., the firmware and/or the operating system, for their part also contain sensitive, vendor-specific details that must not be disclosed.

In one advantageous embodiment, the automation program comprises a recipe for an industrial production, in particular for a chemical product or a pharmaceutical product, or a control sequence for the production of a discrete product. This enables business models based on the principle that products of this type can also be produced at sites to which it is not desirable to entrust the entire production know-how. A local know-how theft in the actual automation environment or production environment cannot therefore comprise the sensitive recipes or production steps or method steps or control algorithms of the automation program.

The server is therefore advantageously configured for data exchange with an industrial automation arrangement, and the automation program is therefore advantageously configured to control or influence or monitor the industrial automation arrangement. Through this data exchange, it is therefore possible to control and monitor corresponding local units from a cloud environment without exposing the dedicated computer hardware to local access. It is furthermore thus possible to control a plurality of local units that can be located at different sites by means of the same computer hardware.

The communication in the cloud between the edge device and the dedicated computer hardware and, in particular, even to the automation program, is advantageously secured. This can preferably achieved via encryption.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the arrangement in accordance with the invention will be explained below with reference to the drawings, in which.

DETAILED DESCRIPTION OF THE EXEMPLARY EMBODIMENTS

Figure 1:
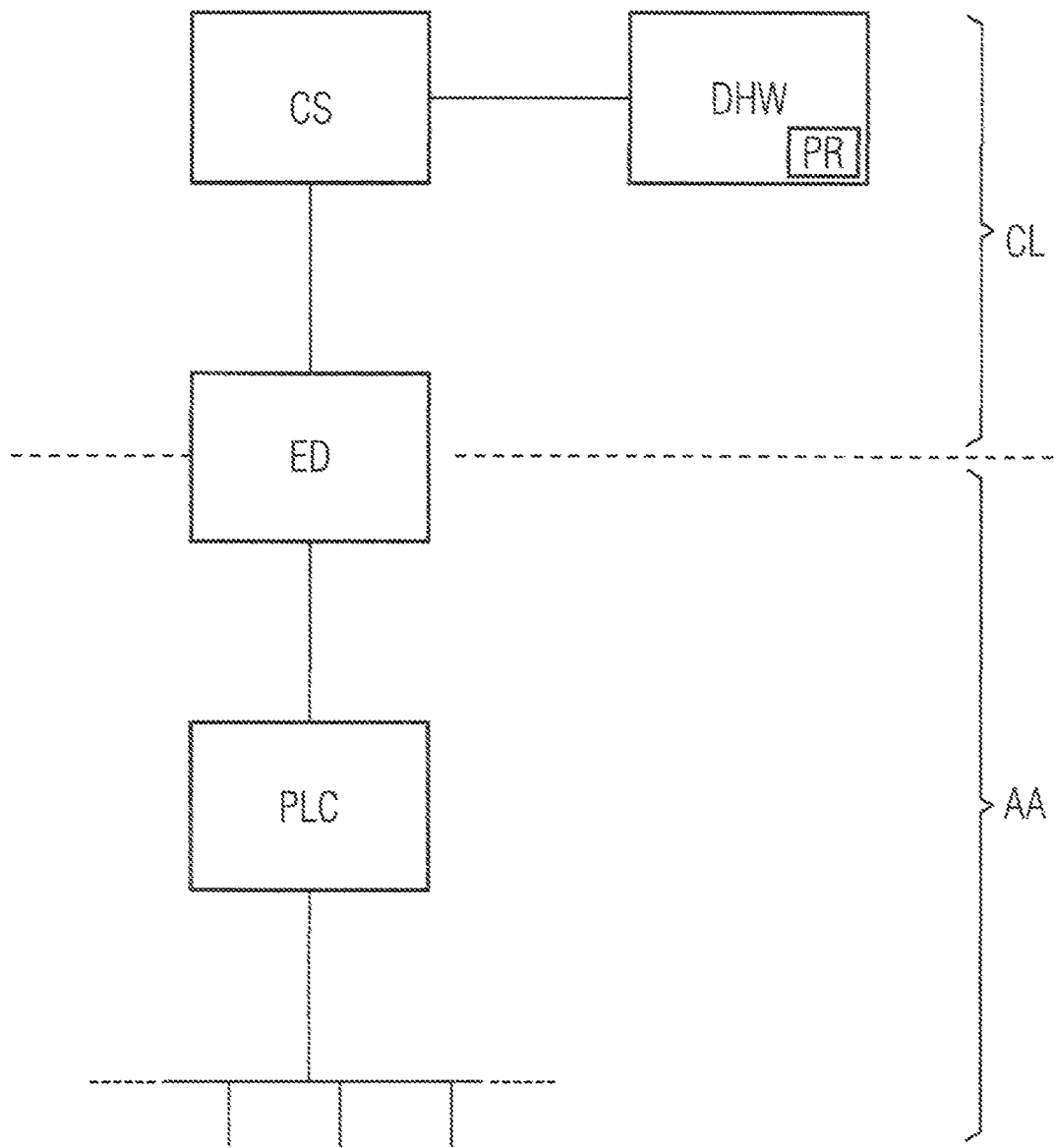
FIG. 1 shows a schematic view of a local automation arrangement and a cloud computing environment with a cloud server and dedicated computer hardware in accordance with the invention.

A distinction is made in the FIG. 1 between a local, private automation level that is located below the horizontally broken line and a public level, known as the cloud CL, such as on the Internet, which is located above the horizontally broken line. The programmable logic controller PLC that is connected via a data connection to an industrial edge device ED is shown in the FIG. 1, representing a local automation arrangement AA, e.g., a process plant. The industrial edge device ED has not only a data connection to the components of the industrial automation arrangement, i.e., in the context of the FIG. 1, the programmable logic controller PLC, but also a further data connection into the public space, here the cloud CL. One component of the cloud CL is a cloud server CS, in this case a server of a cloud computing provider, which can execute ("host") a multiplicity of virtual machines (not shown) for a multiplicity of different customers. The cloud server CS is connected to dedicated computer hardware DHW via a further data connection. The dedicated computer hardware DHW can be a component of the cloud computing environment, but can also be arranged in a different network, in particular in a further, private corporate network. However, it is also possible for the dedicated computer hardware DHW to be a component of the same server farm or the same data center that also provides the cloud server CS. In particular, it is possible for the dedicated computer hardware DHW to be formed as a computer plug-in card and, for example, even to be operated in the same server housing as the cloud server CS shown here.

In the present exemplary embodiment, the dedicated computer hardware DHW is a computer unit which, in terms of its processor, memory and architecture, is similar or even identical to a programmable logic controller as used in process or automation plants. However, unlike the locally operated programmable logic controllers and also the local controller PLC shown here, the dedicated computer hardware DHW is configured with respect to its firmware and with respect to its peripherals such that sensors and actuators that are normally connected directly to the industrial controller PLC via I/O modules in the local industrial environment are operated or read via the dedicated computer hardware DHW via a data channel or a plurality of data channels that are routed via a data connection via the cloud server CS into the local execution level (automation level) and exchange data there, e.g., with a remote I/O module (remote shelf), or have a programmable logic controller PLC located there as a communication partner. Here, this local programmable logic controller PLC then, on the one hand, provides sensor values of the automation solution for the dedicated computer hardware DHW and, on the other hand, receives instructions (actuator values, commands) from the dedicated computer hardware DHW and applies them to the local automation solution.

In one preferred exemplary embodiment, the industrial edge device ED is connected as a gateway component between the local network and the public network, where the industrial edge device ED, as well as security functions (e.g., firewall), can also perform other functions, such as the conversion of sensor data, logging functions, administration functions. In particular, the industrial edge device ED can also provide the user interface, for example, via a web interface, with which it is possible for a user to control and monitor the solution shown here for secure execution of an automation program.

In the following exemplary embodiment, it is intended to be assumed that a number of local production facilities of a company are monitored by software which runs on the cloud server CS. A mineral oil company, for example, can control a number of refineries therewith. The cloud server or the organization program (Manufacturing Execution System (MES)) executing thereon therefore controls, for example, the utilization and monitors the operation of a plurality of petrochemical plants or the like. It is now assumed that a special chemical product or a special pharmaceutical product is intended to be manufactured via a process method, where the corresponding, secret recipe and therefore the specific details of the manufacture of the product were hitherto stored in a local programmable logic controller and executed there, so that the corresponding product was therefore manufactured locally with local know-how. However, for data security reasons, it is now intended to avoid locally retaining the corresponding know-how and therefore the recipe and the cyclical automation program PR for the process production step in a plurality of sites/plants, but they are instead secured against local access. Here, a user initiates, for example, from an administration server or via access to the edge device ED shown, the loading of the dedicated computer hardware DHW with the corresponding automation program PR and the recipe for manufacturing the special product or the special pharmaceutical product. A data channel between the local plant, here the programmable logic controller PLC, and the dedicated computer hardware DHW is simultaneously provided. The local programmable logic controller PLC is connected to the sensors and actuators of the production plant and is remotely controlled with respect to the actuators by the dedicated computer hardware DHW and the automation program running thereon, and, for this purpose, supplies sensor values and other information in the opposite direction from the local production environment as input parameters for the automation program.

In one embodiment, a plurality of local production units can also be controlled more or less simultaneously by the dedicated computer hardware DHW and the automation program running thereon. This is essentially a question of the computing capacity and the characteristics of the data connections.

The dedicated computer hardware DHW therefore comprises the similarly dedicated automation program PR and an essentially identical copy of firmware that would also be used on a local variant of the dedicated computer hardware DHW. The difference lies, on the one hand, in the fact that the firmware and the automation program on the dedicated computer hardware shown here are protected against read-out. It should be understand this also applies to the recipe and other confidential information that are required to execute the automation program. A further difference lies in the fact that information relating to the local conditions, i.e., the process image, is not acquired by the dedicated computer hardware DHW via local sensors there, but is obtained from a local unit of the automation arrangement AA, such as the programmable logic controller PLC. Conversely, actuators are also not connected to directly connected peripherals of the dedicated computer hardware DHW, but are controlled via a local unit, in the present exemplary embodiment the programmable logic controller PLC. It should be understood the data connections are to be matched to a corresponding bandwidth and correspondingly short latency times.

The dedicated computer hardware DHW is therefore special hardware that is specially configured for industrial purposes and can, for example, emulate a special programmable logic controller, or even essentially consists of the relevant hardware modules (processor and/or memory) of the hitherto locally utilized programmable logic controller. It is important that security-critical information, such as firmware, automation program, recipes or other security-critical hardware information, such as TPM modules or cryptomodules, are protected by the architecture shown here. The aforementioned confidential information and hardware features that are to be secured can be particularly effectively protected against readout and other unauthorized access by separating the dedicated computer hardware DHW from the generally accessible cloud server CS comprising or emulating standard hardware. In contrast to solutions in which the programs to be protected often execute on virtual machines, the dedicated computer hardware DHW shown here cannot be duplicated in an unauthorized manner. In the case of conventional virtualization solutions, this means that entire virtual machines along with the automation program, recipes data and other information contained therein can easily be duplicated or cloned and can therefore be misused. The foregoing undesired event is thereby prevented with the disclosed embodiments of the invention.

A further advantage of the architecture shown is that administration of the system can be performed remotely from almost any location, as in the case of any other cloud-based solution, if corresponding access rights and, if necessary, certificates are present.

Figure 2:
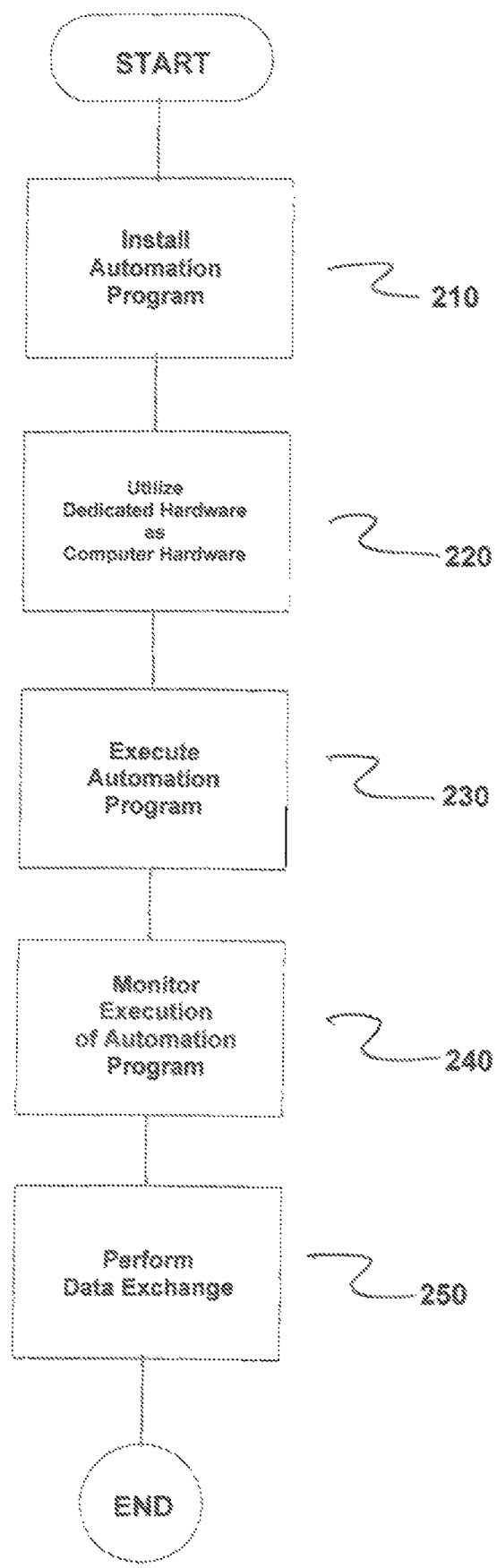
FIG. 2. is a flowchart of the method in accordance with the invention.

FIG. 2 is a flowchart of the method for secure execution of an automation program PR in a cloud computing environment CL. the method comprises installing the automation program PR on computer hardware DHW in a publicly accessible IT infrastructure, as indicated in step 210. Next, dedicated hardware is used as the computer hardware DHW for execution of the automation program PR, as indicated in step 220.

Next, the automation program PR is executed on the computer hardware DHW via a dedicated runtime environment, as indicated in step 230. Next, the execution of the automation program PR is monitored via the data connection, as indicated in step 240.

Next, the data exchange between the computer hardware DHW and an industrial automation arrangement AA is performed via a cloud server CS connected to the computer hardware DHW to at least one of (i) control, (ii) influence or (iii) monitor the industrial automation arrangement AA, as indicated in step 250.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An arrangement for secure execution of an automation program in a cloud computing environment, the arrangement comprising:
    computer hardware in which the automation program is installed in a publicly accessible IT infrastructure, the computer hardware forming dedicated hardware for execution of the automation program and being equipped with a dedicated runtime environment for the automation program, the dedicated hardware executing runtime code having runtime properties identical to runtime properties of a programmable logic controller located at a local execution level and the dedicated hardware being configured to operate sensors or actuators or read data of the sensors or actuators via at least one data channel which is routed via at least one data connection into the local execution level for data exchange with a remote I/O module or the local programmable logic controller located at the local execution level; and
    a cloud server connected to the computer hardware being connected via at least one data connection, the at least one data connection and the dedicated runtime environment being configured such that execution of the automation program is monitored via the cloud server and the data connection;
    wherein the cloud server is configured for data exchange with an industrial automation arrangement and the automation program is configured to one of (i) control, (ii) influence and (iii) monitor the industrial automation arrangement.

2. The arrangement as claimed in patent claim 1, wherein the automation program is transferred onto the computer hardware via the runtime environment and one of the data connections.

3. The arrangement as claimed in patent claim 1, wherein the runtime environment comprises at least one of firmware and an operating system for an industrial automation program.

4. The arrangement as claimed in patent claim 3, wherein at least one of the (i) firmware and (ii) the operating system, and the automation program are secured against readout via the data connection.

5. The arrangement as claimed in patent claim 1, wherein the automation program comprises a recipe for an industrial production.

6. The arrangement as claimed in patent claim 5, wherein the recipe comprises one of a chemical product or a pharmaceutical product.

7. The arrangement as claimed in patent claim 1, further comprising:
    an industrial edge device connected for the data exchange between the server and the industrial automation arrangement;
    wherein the industrial edge device is configured to monitor the data exchange between a private data network with the industrial automation arrangement and the cloud environment.

8. The arrangement as claimed in patent claim 7, wherein the edge device is configured to set up a secure communication connection to the automation program.

9. The arrangement as claimed in patent claim 8, wherein secure communication connection is encrypted.

10. The arrangement as claimed in patent claim 1, wherein the cloud server comprises a server of a cloud computing provider.

11. The arrangement as claimed in patent claim 1, wherein the local programmable logic controller provides sensor values of a local automation solution for the dedicated computer hardware and receives instructions from the dedicated computer hardware for application to the local automation solution.

12. A method for secure execution of an automation program in a cloud computing environment, the method comprising:
    installing the automation program on computer hardware in a publicly accessible IT infrastructure;
    utilizing dedicated hardware as the computer hardware for execution of the automation program, the dedicated hardware executing runtime code having runtime properties identical to runtime properties of a programmable logic controller located at a local execution level and the dedicated hardware being configured to operate sensors or actuators or read data of the sensors or actuators via at least one data channel which is routed via at least one data connection into the local execution level for data exchange with a remote I/O module or the local programmable logic controller located at the local execution level;
    executing the automation program on the computer hardware via a dedicated runtime environment;
    monitoring the execution of the automation program via the data connection;
    performing, via a cloud server connected to the computer hardware, the data exchange between the computer hardware and an industrial automation arrangement to at least one of (i) control, (ii) influence and (iii) monitor the industrial automation arrangement.

13. The method as claimed in patent claim 12, wherein the computer hardware loads the automation program via the data connection from the cloud server.

14. The method as claimed in patent claim 13, wherein the cloud server comprises a server of a cloud computing provider.

15. The method as claimed in patent claim 13, wherein at least one of (i) firmware and (ii) an operating system for an industrial automation program is utilized for the dedicated runtime environment.

16. The method as claimed in patent claim 12, wherein at least one of (i) firmware and (ii) an operating system for an industrial automation program is utilized for the dedicated runtime environment.

17. The method as claimed in patent claim 16, wherein at least one of (i) the firmware and (ii) the operating system, and the automation program are secured against readout via the data connection.

18. The method as claimed in patent claim 12, wherein the automation program comprises a recipe for an industrial production which is controlled via the recipe.

19. The method as claimed in patent claim 18, wherein the recipe comprises one of a chemical product or a pharmaceutical product.

20. The method as claimed in patent claim 12, wherein an industrial edge device is connected for the data exchange between the cloud server and the industrial automation arrangement; and wherein monitoring of the data exchange between a private data network with the industrial automation arrangement and the cloud environment is performed by the industrial edge device.

21. The method as claimed in patent claim 20, wherein communication between the edge device and the automation program is performed in a secured, encrypted manner.

* * * * *